(12) United States Patent
Sridhar et al.

(10) Patent No.: US 10,173,389 B2
(45) Date of Patent: Jan. 8, 2019

(54) CARBON DIOXIDE SHIELDED NATURAL GAS LINE AND METHOD OF USING THEREOF

(71) Applicant: BLOOM ENERGY CORPORATION, Sunnyvale, CA (US)

(72) Inventors: KR Sridhar, Los Gatos, CA (US); Arne Ballantine, Palo Alto, CA (US)

(73) Assignee: BLOOM ENERGY CORPORATION, Sunnyvale, CA (US)

( * ) Notice: Subject to any disclaimer, the term of this patent is extended or adjusted under 35 U.S.C. 154(b) by 45 days.

(21) Appl. No.: 15/377,041

(22) Filed: Dec. 13, 2016

(65) Prior Publication Data

US 2017/0167639 A1    Jun. 15, 2017

Related U.S. Application Data

(60) Provisional application No. 62/267,465, filed on Dec. 15, 2015.

(51) Int. Cl.
| | | |
|---|---|---|
| *B01D 53/22* | (2006.01) | |
| *B32B 1/00* | (2006.01) | |
| *C10L 3/00* | (2006.01) | |
| *H01M 8/0668* | (2016.01) | |
| *H01M 8/04082* | (2016.01) | |
| *C10L 3/10* | (2006.01) | |

(52) U.S. Cl.
CPC ............... *B32B 1/00* (2013.01); *C10L 3/00* (2013.01); *H01M 8/04201* (2013.01); *H01M 8/0668* (2013.01); *C10L 3/104* (2013.01); *C10L 2290/548* (2013.01); *H01M 2250/10* (2013.01); *Y02B 90/14* (2013.01)

(58) Field of Classification Search
CPC .. C10L 3/102; C10L 3/10; C10L 3/104; F16L 9/19; Y02C 10/10; E21B 43/385
See application file for complete search history.

(56) References Cited

U.S. PATENT DOCUMENTS

| | | | | |
|---|---|---|---|---|
| 3,400,547 A | * | 9/1968 | Williams | ................ B63B 25/08 62/50.1 |
| 6,458,478 B1 | * | 10/2002 | Wang | ..................... C01B 3/342 429/411 |
| 6,572,678 B1 | * | 6/2003 | Wijmans | .............. B01D 53/226 95/47 |
| 6,608,463 B1 | * | 8/2003 | Kelly | ................ H01M 8/04089 320/101 |

(Continued)

*Primary Examiner* — Anthony R Shumate
(74) *Attorney, Agent, or Firm* — The Marbury Law Group PLLC (57) ABSTRACT

A natural gas line comprises a concentric pipe having an inner natural gas pipe and an outer carbon dioxide pipe surrounding the inner pipe. Carbon dioxide in the outer pipe comprises a shield which prevents or decreases natural gas leakage to the atmosphere. The carbon dioxide may be supplied from an exhaust of a fuel cell system, such as carbon dioxide separated from the fuel exhaust of a fuel cell system by a carbon dioxide separator. The natural gas may flow from a natural gas field to the fuel cell system via the inner pipe while the carbon dioxide may flow from the fuel cell system to the natural gas field via the outer pipe. The carbon dioxide may be sequestered in the empty space underground in natural gas field created by the extraction of the natural gas.

7 Claims, 5 Drawing Sheets

(56) References Cited

U.S. PATENT DOCUMENTS

| | | | |
|---|---|---|---|
| 6,773,472 B2* | 8/2004 | Oku | B01J 8/009 48/61 |
| 7,736,609 B1* | 6/2010 | Golben | B01D 53/864 423/247 |
| 8,563,180 B2 | 10/2013 | Perry et al. | |
| 9,190,673 B2 | 11/2015 | Venkataraman et al. | |
| 9,190,685 B2 | 11/2015 | McElroy et al. | |
| 9,318,755 B2* | 4/2016 | Ogawa | H01M 8/04089 |
| 9,786,933 B2* | 10/2017 | Yoshimine | H01M 8/04291 |
| 2001/0053470 A1* | 12/2001 | Misumi | H01M 8/04029 429/408 |
| 2003/0031901 A1* | 2/2003 | Breuer | C01B 3/26 429/423 |
| 2003/0077497 A1* | 4/2003 | Cao | H01M 8/04022 429/424 |
| 2003/0118883 A1* | 6/2003 | Breault | H01M 8/04029 429/429 |
| 2005/0067344 A1* | 3/2005 | Tanaka | B01D 69/105 210/490 |
| 2005/0196659 A1* | 9/2005 | Grieve | F02C 1/05 429/415 |
| 2006/0162554 A1* | 7/2006 | Kelley | B01D 53/22 95/45 |
| 2008/0155958 A1* | 7/2008 | Ramakrishnan | F04D 25/04 60/39.5 |
| 2009/0151559 A1* | 6/2009 | Verma | B01D 53/0423 95/96 |
| 2012/0204599 A1* | 8/2012 | Northrop | C10L 3/10 62/617 |
| 2012/0259025 A1* | 10/2012 | Zhao | C25B 1/04 518/704 |
| 2013/0108936 A1* | 5/2013 | McElroy | H01M 8/0668 429/410 |
| 2014/0047979 A1* | 2/2014 | Eimer | B01D 53/1425 95/151 |
| 2014/0345299 A1* | 11/2014 | Kirk | E21B 43/01 62/53.2 |
| 2015/0013380 A1* | 1/2015 | Bauer | F25J 3/0209 62/620 |
| 2017/0081275 A1* | 3/2017 | Grandjean | C10K 1/143 |

* cited by examiner

CARBON DIOXIDE SHIELDED NATURAL GAS LINE AND METHOD OF USING THEREOF

RELATED APPLICATIONS

This application claims the benefit of priority to U.S. Provisional Application No. 62/267,465 entitled "Carbon Dioxide Shielded Natural Gas Line and Method of Using Thereof" filed Dec. 15, 2015, the entire contents of which are hereby incorporated by reference.

TECHNICAL FIELD

The present disclosure generally relates to natural gas lines and, more particularly, to shielding natural gas lines using an outer carbon dioxide pipeline.

BACKGROUND

Natural gas lines carry natural gas from a natural gas extraction site (e.g., a natural gas field) to other locations where it may be stored, shipped, or consumed. For example, a natural gas line may carry natural gas to one or more fuel cell systems, which use the natural gas to generate electrical energy. One of the byproducts of a fuel cell system that uses natural gas as fuel is carbon dioxide. Carbon dioxide is a greenhouse gas. Thus, carbon dioxide should be sequestered rather than released into the atmosphere. In addition, natural gas lines may leak natural gas, which contributes to greenhouse gas emissions and other damaging effects to the environment.

SUMMARY

A natural gas line may include a concentric pipe having an inner natural gas pipe and an outer carbon dioxide pipe surrounding the inner pipe. The carbon dioxide in the outer pipe may act as a shield which prevents or decreases natural gas leakage to the atmosphere. This reduces greenhouse gas emissions and environmentally harmful natural gas leaks. The carbon dioxide may be supplied from an exhaust of a fuel cell system, such as carbon dioxide separated from the fuel exhaust of a solid oxide fuel cell system by a carbon dioxide separator. The natural gas and the carbon dioxide may flow in opposite directions in the natural gas line. For example, the natural gas may flow from a natural gas field to the fuel cell system via the inner pipe while the carbon dioxide may flow from the fuel cell system to the natural gas field via the outer pipe. The carbon dioxide separated from the fuel cell fuel exhaust may be sequestered in the empty space underground in the natural gas field created by the extraction of the natural gas. Thus, the natural gas and carbon dioxide trade places in the natural gas field by transporting the natural gas and carbon dioxide in opposite directions through a concentric pipe between the natural gas field and the fuel cell system.

Various embodiments disclosed herein include a natural gas line that includes a concentric pipe having an inner pipe and an outer pipe surrounding the inner pipe, in which the inner pipe contains natural gas and the outer piper contains carbon dioxide.

Further embodiments disclosed herein include a system comprising a fuel cell system having a fuel inlet and a fuel exhaust, and a natural gas line comprising a concentric pipe having an inner natural gas pipe and an outer carbon dioxide pipe surrounding the inner pipe. The inner pipe is connected to a natural gas field and to the fuel inlet of the fuel cell system, and the outer pipe is connected to the fuel exhaust of a fuel cell system.

Further embodiments disclosed herein include a method of using a natural gas line, the method including flowing natural gas in an inner pipe of the natural gas pipe, and flowing carbon dioxide in an outer pipe of the natural gas pipe that surrounds the inner pipe.

BRIEF DESCRIPTION OF THE DRAWINGS

The accompanying drawings, which are incorporated herein and constitute part of this specification, illustrate examples of the disclosed devices and methods, and together with the general description given above and the detailed description given below, serve to explain the features of the invention.

DETAILED DESCRIPTION

The various examples will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims. It is also understood that the examples shown in the figures are not mutually exclusive. Features shown in one example (e.g., in one figure) may be included in other examples (e.g., in other figures).

Natural Gas Lines

A natural gas line may natural gas from a natural gas extraction site (e.g., a natural gas field) to other locations where it may be stored, shipped, or used. For example, a natural gas line may provide natural gas to a fuel cell system, where is it used to produce electrical energy (i.e., used as fuel to generate electricity). The fuel exhaust from the fuel cell system may include carbon dioxide.

Figure 1:
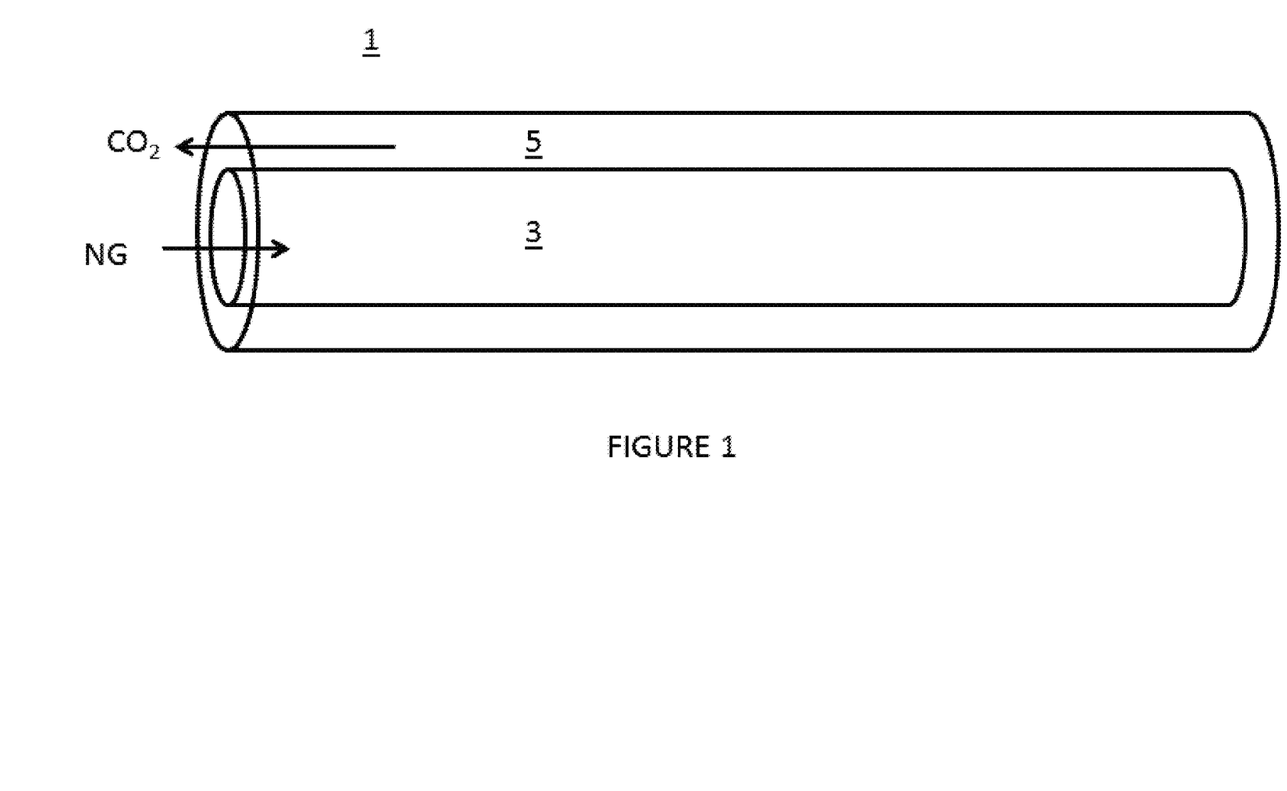
FIG. 1 is a perspective view of a concentric natural gas pipeline according to the present disclosure.

Various embodiments disclosed herein may utilize the carbon dioxide produced by the fuel cell system to shield the natural gas pipeline in order to reduce natural gas leakage into the atmosphere. FIG. 1 is a perspective view of a natural gas pipeline 1 according to the present disclosure. The natural gas line 1 is a concentric pipe that includes an inner pipe 3 and an outer pipe 5 surrounding the inner pipe 3. One end of the natural gas line 1 may be connected to a natural gas field that produces natural gas (NG) to be transported through the natural gas pipeline 1. The natural gas may be carried in the inner pipe 3.

The other end of the natural gas line 1 may be connected to the exhaust of a fuel cell system. The fuel exhaust may include carbon dioxide ($CO_2$). A carbon dioxide separator may separate the carbon dioxide from the other components of the fuel exhaust. The carbon dioxide may be carried in the outer pipe 5. As shown in FIG. 1, the natural gas in the inner pipe 3 and the carbon dioxide in the outer pipe 5 flow in opposite directions in the natural gas pipe 1. For example, natural gas may flow from the natural gas field to the fuel cell system, while carbon dioxide may flow from the fuel cell system to the natural gas field.

The carbon dioxide in the outer pipe 5 may act as a shield that prevents or decreases natural gas leakage from the inner pipe 3 to the atmosphere. In other words, if natural gas leaks from the inner pipe 3, then it would leak into the carbon dioxide flowing in the outer pipe 5. The flowing carbon dioxide then carries the leaked natural gas to a carbon dioxide sequestration location, such as the natural gas field that is supplying the natural gas to the inner pipe 3. This reduces greenhouse gas emissions and environmentally harmful natural gas leaks, since natural gas is a more environmentally harmful greenhouse gas than carbon dioxide.

The outer pipe 5 may be made of any suitable material, such as plastic or metal, since it merely carries carbon dioxide. Thus, the outer pipe 5 may be made of a less expensive material than the inner pipe 3, which is typically made of a metal alloy suitable for transport of natural gas.

Figure 2:
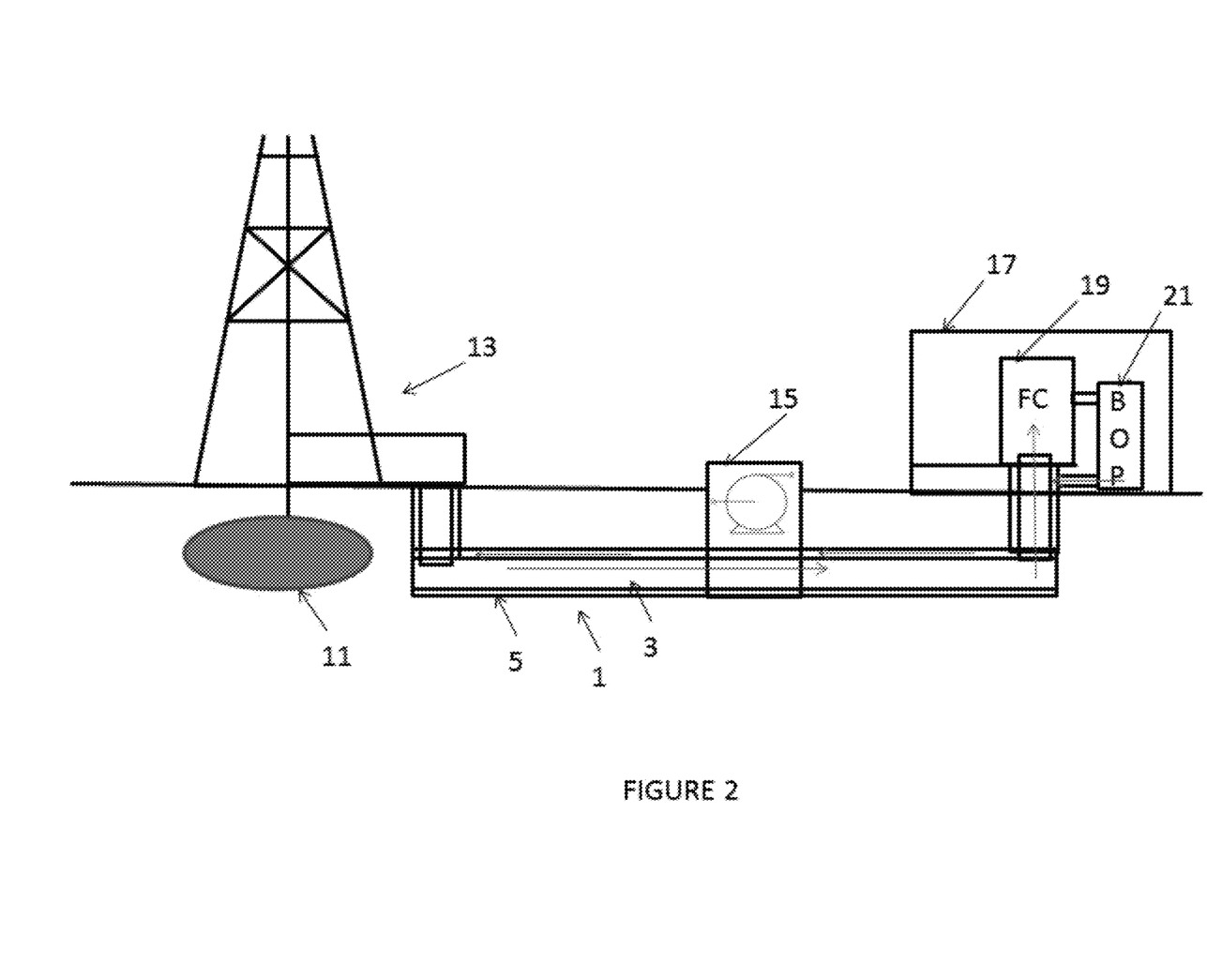
FIG. 2 is a schematic diagram of a natural gas and carbon dioxide pipeline between a natural gas field and a fuel cell system according to the present disclosure.

FIG. 2 is a schematic diagram of a natural gas and carbon dioxide pipeline between a natural gas field and a fuel cell system according to the present disclosure. FIG. 2 includes the concentric natural gas line 1, one end of which may connect to a source of natural gas, such as a natural gas storage tank or a natural gas field 11. The other end of the natural gas line 1 is connected to a remote location, such as a location of a fuel cell system 17. For example, the source of natural gas may be the natural gas field 11, which contains a deposit of natural gas located underground. The deposit may be located below dry land (e.g., a shale field) or below a body of water, such as below a sea or ocean. The natural gas field 11 may include natural gas extraction and/or storage equipment 13, such as a natural gas pumping tower and/or gas storage tanks. The natural gas line 1 may be connected to the equipment 13 in any suitable way to permit natural gas to flow from the natural gas field 11 via the inner pipe 3 of the natural gas line 1.

One or more natural gas pumping stations 15 may be located along the natural gas line 1. Each pumping station 15 may include a pump that pumps the natural gas to enable it to flow farther along the natural gas line 1, such as to the fuel cell system 17. The pumping station 15 may be configured to also pump the carbon dioxide in the outer pipe 5 from the fuel cell system 17 to the natural gas field 11. The pumping station equipment (e.g., conduits) may also be surrounded by the outer pipe 5 to prevent or reduce natural gas leakage in the pumping station 15.

In an alternative embodiment, the fuel cell system 17 may be located sufficiently close to the natural gas field 11 such that there is no pumping station 15 located between the natural gas extraction/storage equipment 13 and the fuel cell system 17. In this case, the fuel cell system 17 may be connected to the electrical grid to provide electrical power to remote locations.

The fuel cell system 17 may contain one or more fuel cells 19, such as one or more fuel cell stacks or columns (e.g., solid oxide fuel cell columns). The inner pipe 3 of the natural gas line 1 may be fluidly connected to the fuel inlet of the fuel cells 19 such that the fuel cells 19 may generate electricity using air provided to the cathode electrodes and the natural gas fuel provided to the anodes from the inner pipe 3. The fuel cells 19 may generate a carbon dioxide rich fuel exhaust stream, which includes carbon dioxide, water and optionally remaining natural gas and carbon monoxide.

The fuel exhaust stream may be provided to a balance of plant (BOP) system 21. The BOP system 21 may include one or more of a carbon dioxide separator, heat exchangers, anode tail gas oxidizer, blowers, pumps, etc. The carbon dioxide separator may be a membrane type electrochemical separator which separates carbon dioxide from the fuel exhaust stream, such as a separator described in U.S. Pat. No. 9,190,685 assigned to Bloom Energy Corp, which is hereby incorporated by reference in its entirety. The BOP system 21 provides the separated carbon dioxide into the outer pipe 5 of the natural gas line 1. One or more blowers or pumps may be provided in the BOP system 21 to move the carbon dioxide from the BOP system 21 into the outer pipe 5.

The carbon dioxide then flows through the outer pipe 5 of the natural gas line 1 from the fuel cell system 17 to the field 11. The pumping station(s) 15 may be used to pump the carbon dioxide along the outer pipe 5 in the opposite direction to the flow of the natural gas in the inner pipe. The cost of pumping the carbon dioxide is offset by greenhouse gas reduction and natural gas leak reduction provided by the carbon dioxide shielding gas flowing in the outer pipe 5 around the inner pipe 3 which carries the natural gas.

Once the carbon dioxide reaches the natural gas field 11, it may be injected by the equipment 13 directly into the empty space (e.g., cavity or void) located underground in natural gas field 11 which is created by the extraction of the natural gas. Alternatively, the carbon dioxide may be temporarily stored in a storage vessel (e.g., storage tank) until extraction of natural gas from a first portion of the natural gas field 11 is completed, followed by injecting the stored carbon dioxide into the empty space underground in the first portion of the natural gas field 11 created by the extraction of the natural gas.

While only one fuel cell system 17 is shown for clarity, it should be understood that the natural gas line 1 may be connected to multiple modular fuel cell systems 17 located in different locations, and each fuel cell system 17 may provide carbon dioxide to the outer pipe 5 of the natural gas line 1. Furthermore, while the fuel cell systems 17 are described for illustration, other power generators or industrial plants which use natural gas fuel and generate a carbon dioxide containing exhaust may be used instead or in addition to the fuel cell systems 17.

If desired, a carbon dioxide sequestering agent may be added to the underground cavity in addition to the carbon dioxide to increase the amount of stored carbon dioxide. The agent may comprise any suitable mineral, such as magnesium oxide or calcium oxide, which reacts with the carbon dioxide to provide carbon sequestration by mineral carbonation. In other words, the carbon dioxide gas reacts with the magnesium or calcium oxide to form a stable solid magnesium or calcium carbonate material which fills the cavity.

One mole of carbon dioxide occupies the same volume as one mole of natural gas. Thus, carbon dioxide may be inexpensively sequestered underground in the cavity created by extraction of the natural gas. The sequestered carbon dioxide may possibly stabilize the ground of the natural gas field 11 by filling the cavity, especially if it is stored in the solid carbonate form.

Figure 3:
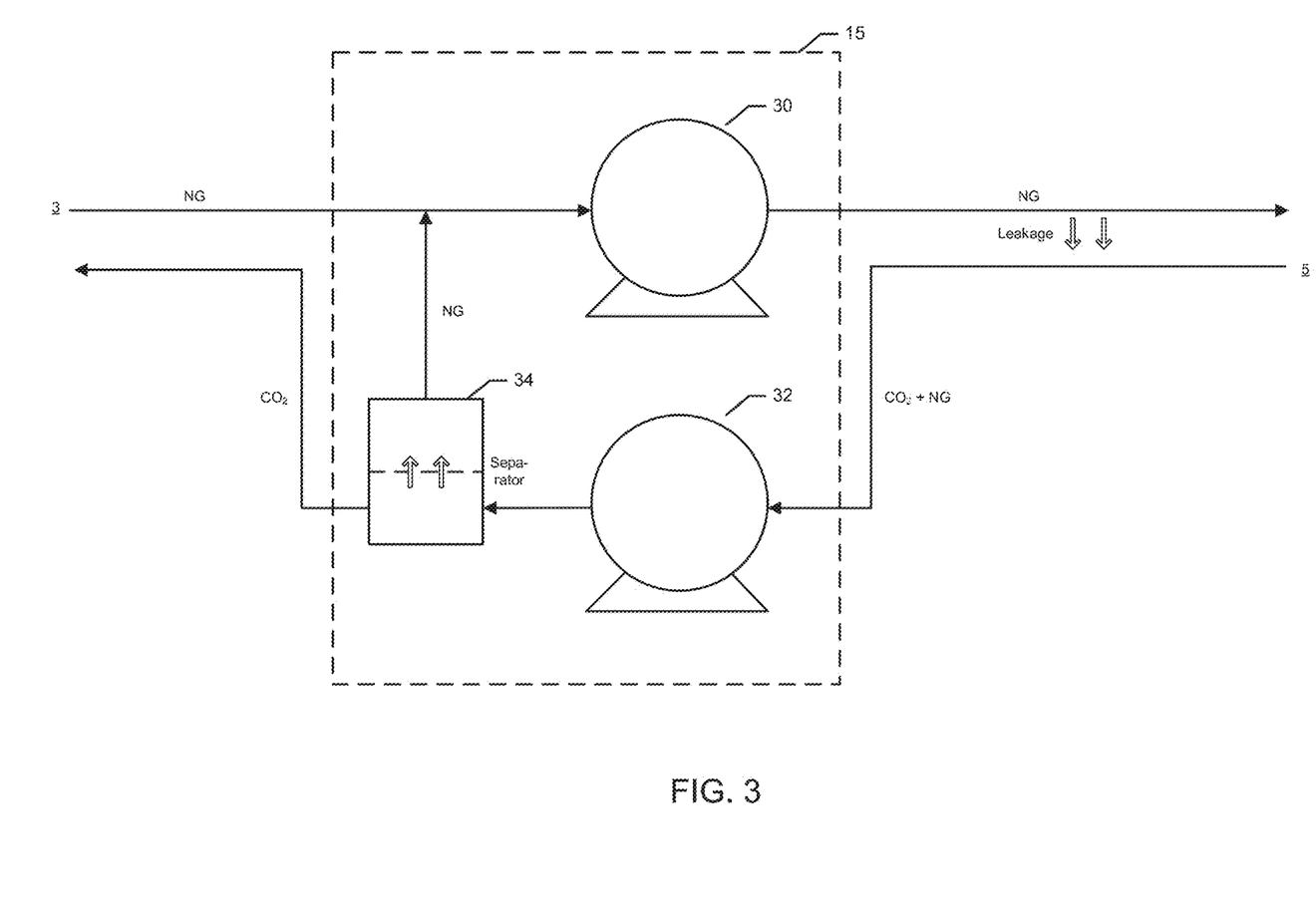
FIG. 3 is a schematic diagram of a natural gas pumping station according to the present disclosure.

FIG. 3 illustrates a schematic diagram of the natural gas pumping station 15 according to the present disclosure. The pumping station 15 may include a pump 30 for pumping natural gas from the inner piper 3 along to its destination (e.g., the fuel cell system 17), and a pump 32 for pumping carbon dioxide from the outer pipe 5 along to its destination (e.g., the natural gas field 11).

Some natural gas may leak from the inner pipe 3 into the carbon dioxide in the outer pipe 5. Thus the inlet of the pump 32 may be a mixture of carbon dioxide and natural gas. A separator 34 may be located at the outlet of the pump 32. The separator 34 may separate the natural gas from the carbon dioxide. The natural gas separated from the separator 34 may be fed back into the inner pipe 3, while the remaining carbon dioxide may remain in the outer pipe 5. This may increase the natural gas yield delivered to the fuel cell system 17. The separator 34 may include any kind of membrane separator that may be able to separate a hydrocarbon (e.g., natural gas, methane, etc.) from carbon dioxide, such as the separator described in U.S. Pat. No. 9,190,685 assigned to Bloom Energy Corp., which is hereby incorporated by reference in its entirety.

Methods of Using a Natural Gas Line

Figure 4:
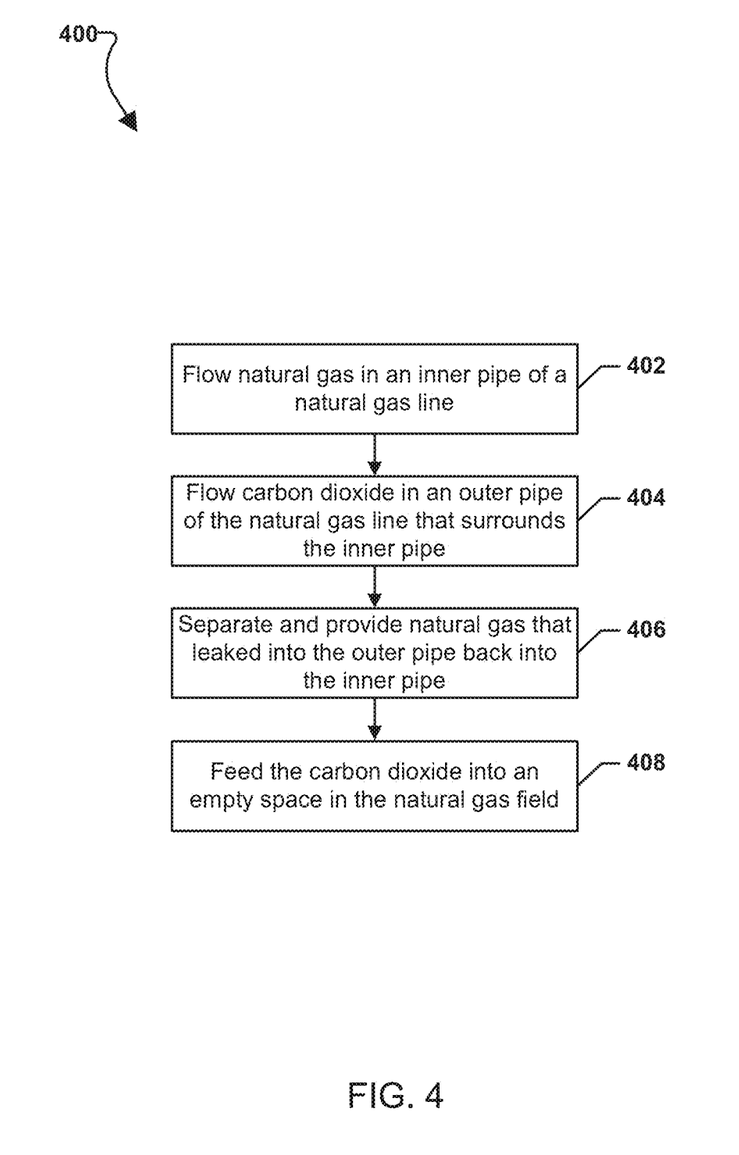
FIG. 4 is a flowchart illustrating a method for transporting natural gas according to the present disclosure.

FIG. 4 shows a flowchart illustrating an example of a method 400 of using a natural gas line. The method 400 may be performed by a natural gas system that includes a natural gas line that connects a natural gas field or another natural gas extraction site and a location at which the natural gas is used (e.g., a fuel cell system).

In block 402, the natural gas system may flow natural gas in an inner pipe of the natural gas pipe. The natural gas pipe may be a concentric pipe with an inner pipe and an outer pipe surrounding the inner pipe. Natural gas extracted from the natural gas field may be fed into the inner pipe of the natural gas field. The inner pipe may be made of a metal alloy suitable for transport of natural gas.

In block 404, the natural gas system may flow carbon dioxide in the outer pipe of the natural gas pipeline. A fuel cell system may receive the natural gas from the natural gas line and consume it to produce electrical energy. The fuel cell system may produce a fuel exhaust that includes carbon dioxide. The fuel cell system may include a carbon dioxide separator that separates the carbon dioxide from the rest of fuel exhaust. The carbon dioxide is then fed into the outer piper of the natural gas line. The outer pipe may be made of any suitable material, such as plastic or metal, since it merely carries carbon dioxide. The natural gas and the carbon dioxide may flow in opposite directions so that the natural gas is provided from the natural gas field to the fuel cell system and the carbon dioxide is provided from the fuel cell system to the natural gas field.

In block 406, the natural gas system may separate carbon dioxide from natural gas that has leaked from the inner pipe to the outer pipe and to provide the natural gas back into the inner pipe. Natural gas in the inner pipe may leak out of the inner pipe and into the outer pipe. However, the presence of the outer pipe and the carbon dioxide may decrease leakage of the natural gas from the natural gas line into the atmosphere. A pumping station located along the natural gas line may include pumps that pump the natural gas and the carbon dioxide further through the natural gas line. The pumping station may also include a separator that separates carbon dioxide from the natural gas that has leaked into the outer pipe and returns the separated natural gas back into the inner pipe.

In block 408, the natural gas system may feed the carbon dioxide into an empty space in the natural gas field created by removal of the natural gas. For example, once the carbon dioxide reaches the natural gas field, it may be injected directly into the empty space (e.g., cavity or void) located underground in natural gas field which is created by the extraction of the natural gas. Alternatively, the carbon dioxide may be temporarily stored in a storage vessel until extraction of natural gas from a first portion of the natural gas field is completed, followed by injecting the stored carbon dioxide into the empty space underground in the first portion of the natural gas field created by the extraction of the natural gas. In this manner, the method 400 allows the carbon dioxide produced from consuming natural gas to prevent leakage of natural gas from a natural gas pipeline.

Fuel Cell Module

Figure 5:
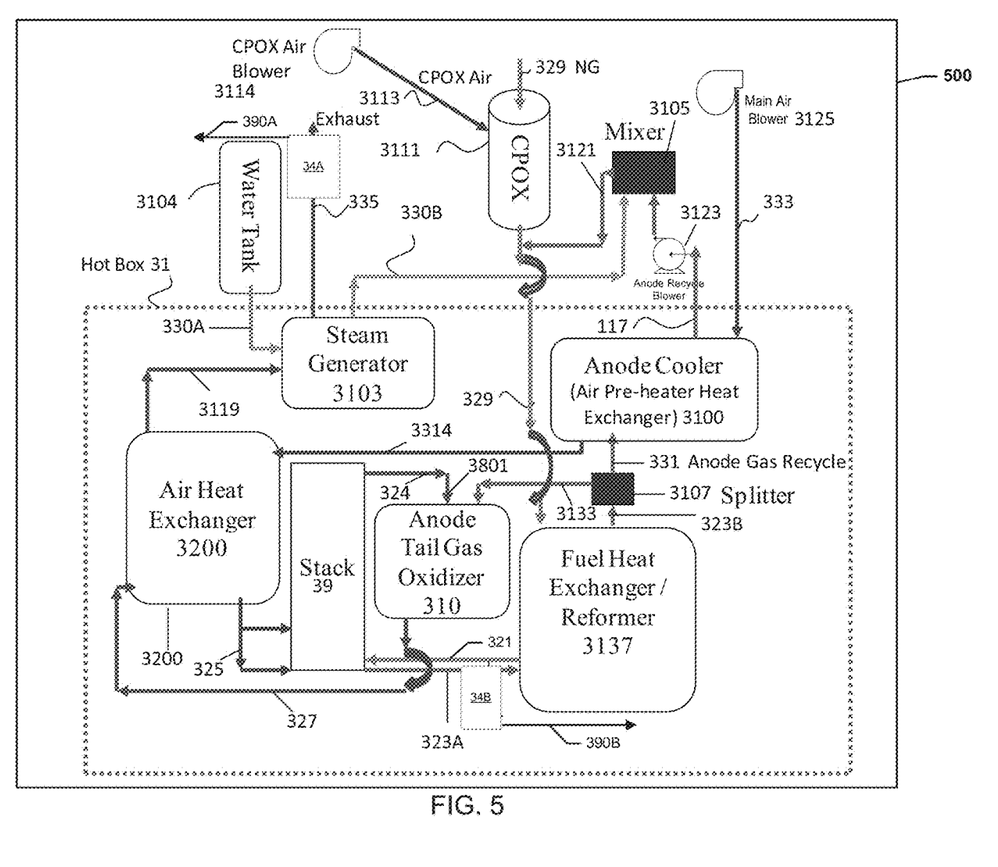
FIG. 5 is a component block diagram of a fuel cell module in a fuel cell system according to the present disclosure.

FIG. 5 is a schematic process flow diagram representation of a fuel cell module 500 that may be part of the fuel cell system 17. The fuel cell module 500 may include a hot box 31 and other components showing the various flows through the components, as described in U.S. Pat. No. 8,563,180 issued on Oct. 22, 2013 and incorporated herein by reference in its entirety.

The hot box 31 contains the plurality of the fuel cell stacks 39, such as a solid oxide fuel cell stacks (where one solid oxide fuel cell of the stack contains a ceramic electrolyte, such as yttria stabilized zirconia (YSZ) or scandia stabilized zirconia (SSZ), an anode electrode, such as a nickel-YSZ or Ni-SSZ cermet, and a cathode electrode, such as lanthanum strontium manganite (LSM)). The stacks 39 may be arranged over each other in a plurality of columns or segments.

The fuel inlet line or conduit 329 may comprise the fuel inlet of the fuel cell system 17 and may be directly or indirectly is connected the inner pipe 3 of the natural gas line 1 shown in FIGS. 1 and 2. The hot box 31 also contains a steam generator 3103. The steam generator 3103 is provided with water through conduit 330A from a water source 3104, such as a water tank or a water pipe (i.e., a continuous water supply), and converts the water to steam. The steam is provided from generator 3103 to mixer 3105 through conduit 330B and is mixed with the stack anode (fuel) recycle stream in the mixer 3105. The mixer 3105 may be located inside or outside the hot box of the hot box 31. Preferably, the humidified anode exhaust stream is combined with the fuel inlet stream in the fuel inlet line or conduit 329 downstream of the mixer 3105, as schematically shown in FIG. 5. Alternatively, if desired, the fuel inlet stream may also be provided directly into the mixer 3105, or the steam may be provided directly into the fuel inlet stream and/or the anode exhaust stream may be provided directly into the fuel inlet stream followed by humidification of the combined fuel streams. The steam generator 3103 is heated by the hot anode tailgas oxidizer ("ATO") 310 exhaust stream which is passed in heat exchange relationship in conduit 3119 with the steam generator 3103.

The system operates as follows. The fuel inlet stream, such as a hydrocarbon stream, for example natural gas, is provided into the fuel inlet conduit 329 and through a catalytic partial pressure oxidation (CPOx) reactor 3111 located outside the hot box 31. During system start up, air is also provided into the CPOx reactor 3111 through CPOx air inlet conduit 3113 to catalytically partially oxidize the fuel inlet stream. The air may be blown through the air inlet conduit 3113 to the CPOx reactor 3111 by a CPOx air blower 3114. The CPOx air blower 3114 may only operate during startup. During steady state system operation, the air flow is turned off (e.g., by powering off the CPOx air blower 3114) and the CPOx reactor acts as a fuel passage way in which the fuel is not partially oxidized. Thus, the hot box 31 may comprise only one fuel inlet conduit which provides fuel in both start-up and steady state modes through the CPOx reactor 3111. Therefore a separate fuel inlet conduit which bypasses the CPOx reactor during steady state operation is not required.

The fuel inlet stream is provided into the fuel heat exchanger (anode recuperator)/pre-reformer 3137 where its temperature is raised by heat exchange with the stack 39 anode (fuel) exhaust streams. The fuel inlet stream is pre-reformed in the pre-reformer section of the heat exchanger 3137 via the SMR reaction and the reformed fuel inlet stream (which includes hydrogen, carbon monoxide, water vapor and unreformed methane) is provided into the stacks 39 through the fuel inlet conduit(s) 321. The fuel inlet stream travels upwards through the stacks through fuel inlet risers in the stacks 39 and is oxidized in the stacks 39 during electricity generation. The oxidized fuel (i.e., the anode or fuel exhaust stream) travels down the stacks 39 through the fuel exhaust risers and is then exhausted from the stacks through the fuel exhaust conduit 323A into the fuel heat exchanger 3137.

In the fuel heat exchanger 3137, the anode exhaust stream heats the fuel inlet stream via heat exchange. The anode exhaust stream is then provided via the fuel exhaust conduit 323B into a splitter 3107. A first portion of the anode exhaust stream is provided from the splitter 3107 the ATO 310 via conduit (e.g., slits) 3133.

A second portion of the anode exhaust stream is recycled from the splitter 3107 into the anode cooler 3100 and then into the fuel inlet stream. For example, the second portion of the anode exhaust stream is recycled through conduit 331 into the anode cooler (i.e., air pre-heater heat exchanger) where the anode exhaust stream pre-heats the air inlet stream from conduit 333. The anode exhaust stream is then provided by the anode recycle blower 3123 into the mixer 3105. The anode exhaust stream is humidified in the mixer 3105 by mixing with the steam provided from the steam generator 3103. The humidified anode exhaust stream is then provided from the mixer 3105 via humidified anode exhaust stream conduit 3121 into the fuel inlet conduit 329 where it mixes with the fuel inlet stream.

The air inlet stream is provided by a main air blower 3125 from the air inlet conduit 333 into the anode cooler heat exchanger 3100. The blower 3125 may comprise the single air flow controller for the entire system, as described above. In the anode cooler heat exchanger 3100, the air inlet stream is heated by the anode exhaust stream via heat exchange. The heated air inlet stream is then provided into the air heat exchanger (cathode recuperator) 3200 via conduit 3314. The heated air inlet stream is provided from heat exchanger 3200 into the stack(s) 39 via the air inlet conduit and/or manifold 325.

The air passes through the stacks 39 into the cathode exhaust conduit 324 and through conduit 324 and mixer 3801 into the ATO 310. In the ATO 310, the air exhaust stream oxidizes the split first portion of the anode exhaust stream from conduit 3133 to generate an ATO exhaust stream. The ATO exhaust stream is exhausted through the ATO exhaust conduit 327 into the air heat exchanger 3200. The ATO exhaust stream heats air inlet stream in the air heat exchanger 3200 via heat exchange. The ATO exhaust stream (which is still above room temperature) is then provided from the air heat exchanger 3200 to the steam generator 3103 via conduit 3119. The heat from the ATO exhaust stream is used to convert the water into steam via heat exchange in the steam generator 3103. The ATO exhaust stream is then removed from the system via the exhaust conduit 335.

The exhaust from the fuel cell stacks 39 may be provided into one or more carbon dioxide separators 34A, 34B to separate the carbon dioxide from the rest of the exhaust. The separated carbon dioxide may then be provided into the outer pipe 5 of the natural gas line 1 via one or more carbon dioxide exhaust conduits 390A, 390B. The carbon dioxide separator(s) 34A, 34B may be located at any suitable location in the fuel cell module 500.

In one embodiment, a carbon dioxide separator 34A is located on the exhaust conduit 335. In this embodiment, the carbon dioxide is separated from the ATO exhaust stream in the carbon dioxide separator 34A and provided into the outer pipe 5 of the natural gas line 1 via carbon dioxide exhaust conduit 390A, such as by using a pump or blower for example.

In another embodiment, a carbon dioxide separator 34B is located on the fuel exhaust conduit 323A upstream of the fuel heat exchanger 3137. In this embodiment, the carbon dioxide is separated from the stack anode exhaust stream in the carbon dioxide separator 34B and provided into the outer pipe 5 of the natural gas line 1 via carbon dioxide exhaust conduit 390B, such as by using a pump or blower for example. In other embodiments, the carbon dioxide separator 34B may be located in other locations, such as on conduits 323B, 331, 117, 3121 or 3133. In one embodiment, both carbon dioxide separators 34A and 34B can be used in the same system.

The construction and arrangements of the fuel cell system module and the fuel cell system, as shown in the various examples, are illustrative only. Although only a few examples have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. Other substitutions, modifications, changes, and omissions may also be made in the design, operating conditions and arrangement of the various examples without departing from the scope of the present disclosure. Any one or more features of any example may be used in any combination with any one or more other features of one or more other examples. It is intended that the specification and examples be considered as exemplary only, with a true scope being indicated by the following claims and their equivalents.

The preceding description of the disclosed aspects is provided to enable any person skilled in the art to make or use the present aspects. Various modifications to these aspects will be readily apparent to those skilled in the art, and the generic principles defined herein may be applied to some aspects without departing from the spirit or scope of the written description. Thus, the present disclosure is not intended to be limited to the aspects shown herein but is to be accorded the widest scope consistent with the following claims and the principles and novel features disclosed herein.

What is claimed is:
1. A system, comprising:
a fuel cell system having a fuel inlet and a fuel exhaust; and
a natural gas line comprising a concentric pipe having an inner natural gas pipe and an outer carbon dioxide pipe surrounding the inner pipe, wherein the inner pipe is connected to a natural gas field and to the fuel inlet of the fuel cell system, and the outer pipe is connected to the fuel exhaust of a fuel cell system.

2. The system of claim 1, wherein:
the inner pipe contains natural gas and the outer piper contains carbon dioxide;
the natural gas is supplied from the natural gas field connected to the natural gas line; and
the carbon dioxide is supplied from the fuel exhaust of the fuel cell system.

3. The system of claim 2, wherein the natural gas and the carbon dioxide flow in opposite directions in the natural gas line.

4. The system of claim 2 further comprising a carbon dioxide separator located in the fuel cell system which is configured to separate the carbon dioxide from the fuel exhaust.

5. The system of claim 2, further comprising:
a pumping station located along the natural gas line between the natural gas field and the fuel cell system, wherein the pumping station comprises:
a first pump for pumping the natural gas from the natural gas field to the fuel cell system;
and
a second pump for pumping the carbon dioxide from the fuel cell system to the natural gas field.

6. The system of claim 5, wherein the natural gas leaks from the inner piper into the outer pipe, and the pumping station further comprises a separator for separating carbon dioxide from natural gas in the outer pipe and for providing the separated natural gas back into the inner pipe.

7. The system of claim 2, wherein the carbon dioxide is fed into an empty space in the natural gas field created by removal of the natural gas.

* * * * *